(12) United States Patent
Ichieda

(10) Patent No.: US 10,354,428 B2
(45) Date of Patent: Jul. 16, 2019

(54) DISPLAY DEVICE AND METHOD OF CONTROLLING DISPLAY DEVICE

(71) Applicant: SEIKO EPSON CORPORATION, Tokyo (JP)

(72) Inventor: Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 23 days.

(21) Appl. No.: 15/695,518

(22) Filed: Sep. 5, 2017

(65) Prior Publication Data

US 2018/0075633 A1    Mar. 15, 2018

(30) Foreign Application Priority Data

Sep. 12, 2016   (JP) ................................ 2016-177223

(51) Int. Cl.
| | |
|---|---|
| *G06T 11/60* | (2006.01) |
| *G06T 7/30* | (2017.01) |
| *G06F 3/048* | (2013.01) |
| *G06F 3/0484* | (2013.01) |

(52) U.S. Cl.
CPC .............. *G06T 11/60* (2013.01); *G06F 3/048* (2013.01); *G06F 3/0484* (2013.01); *G06T 7/30* (2017.01)

(58) Field of Classification Search
CPC ...................................................... G06T 11/60
USPC .................. 345/629–641; 715/762–764, 792
See application file for complete search history.

(56) References Cited

U.S. PATENT DOCUMENTS

| | | | | |
|---|---|---|---|---|
| 7,937,665 | B1* | 5/2011 | Vazquez | G05B 19/0426 715/763 |
| 9,317,171 | B2 | 4/2016 | Chiu et al. | |
| 9,411,432 | B2 | 8/2016 | Tang et al. | |
| 2005/0024341 | A1* | 2/2005 | Gillespie | G06F 1/1616 345/173 |
| 2006/0071938 | A1* | 4/2006 | Richardson | G09G 5/02 345/591 |
| 2010/0241648 | A1* | 9/2010 | Ito | G06F 17/30011 707/765 |
| 2010/0262673 | A1* | 10/2010 | Chang | G06F 3/1454 709/217 |

(Continued)

FOREIGN PATENT DOCUMENTS

| | | |
|---|---|---|
| JP | 2011-129068 A | 6/2011 |
| JP | 2012-104096 A | 5/2012 |

(Continued)

*Primary Examiner* — Ryan R Yang
(74) *Attorney, Agent, or Firm* — Oliff PLC

(57) ABSTRACT

A projector includes a display unit that displays an input image which is based on an input image signal and a plurality of operation detection markers used for operation detection, on a screen, an operation detection unit that detects an operation on each of the plurality of operation detection markers based on the image captured by the imaging unit, and a processing performance control unit that performs processing corresponding to the operation detection marker from which the operation is detected by the operation detection unit. The operation detection unit causes the plurality of operation detection markers to be displayed at the outside of the input image on the screen, and causes a plurality of icons corresponding to each of the plurality of operation detection markers to be displayed at the position corresponding to the operation detection marker.

11 Claims, 7 Drawing Sheets

(56) References Cited

U.S. PATENT DOCUMENTS

| | | | |
|---|---|---|---|
| 2011/0035665 A1* | 2/2011 | Kim | G06F 3/04883 |
| | | | 715/702 |
| 2012/0098865 A1* | 4/2012 | Takano | G03B 21/26 |
| | | | 345/660 |
| 2012/0099834 A1* | 4/2012 | Nomoto | G11B 31/006 |
| | | | 386/230 |
| 2012/0221973 A1* | 8/2012 | Chaudhri | G06F 3/04817 |
| | | | 715/821 |
| 2013/0050291 A1* | 2/2013 | Nobori | H04N 9/3155 |
| | | | 345/690 |
| 2013/0057764 A1* | 3/2013 | Choi | H04N 21/42222 |
| | | | 348/563 |
| 2013/0235069 A1* | 9/2013 | Ubillos | G09G 5/026 |
| | | | 345/594 |
| 2014/0137009 A1* | 5/2014 | Mussoff | H04L 67/42 |
| | | | 715/764 |
| 2014/0168168 A1* | 6/2014 | Ichieda | G06F 3/042 |
| | | | 345/175 |
| 2014/0232273 A1* | 8/2014 | Sasaki | G06F 3/04817 |
| | | | 315/131 |
| 2014/0359438 A1* | 12/2014 | Matsuki | G02B 7/36 |
| | | | 715/702 |
| 2015/0074566 A1* | 3/2015 | Lee | G06F 3/0488 |
| | | | 715/763 |
| 2017/0031187 A1 | 2/2017 | Douyou | |
| 2017/0033680 A1 | 2/2017 | Li | |

FOREIGN PATENT DOCUMENTS

| | | |
|---|---|---|
| JP | 2014-211858 A | 11/2014 |
| JP | 2015-179491 A | 10/2015 |
| JP | 2017-32782 A | 2/2017 |
| JP | 2017-33042 A | 2/2017 |
| JP | 2017-33044 A | 2/2017 |

* cited by examiner

DISPLAY DEVICE AND METHOD OF CONTROLLING DISPLAY DEVICE

BACKGROUND

1. Technical Field

The present invention relates to a display device and a method of controlling the display device.

2. Related Art

In the related art, a display device is known, in which an operation icon used for an operation detection is displayed, and an operation on the operation icon is detected, and then, corresponding processing is performed (refer to JP-A-2012-104096).

In JP-A-2012-104096, an operation icon is displayed in a projection image on a projector, and when an operation on the operation icon is detected using an image captured by a camera which images an area including the projection image, it is determined that the operation icon is selected and the processing set in association with the operation icon is performed.

However, in the projector disclosed in JP-A-2012-104096, since the operation icon is displayed in the projection image in a superimposed manner, the detection of the operation on the operation icon is influenced by a display state of the projection image (brightness, color tone, or the like), that is, a display state of the background of the operation icon, and thus, there is a possibility that detection accuracy may be decreased.

SUMMARY

An advantage of some aspects of the invention is to provide a display device that can detect an operation on a displayed detection image with high accuracy, and can display processing items or the like related to the detection image in an easily understandable manner.

An aspect of the invention is directed to a display device including a display unit that displays an image on a display surface, a display control unit that causes the display unit to display an input image which is based on an input image signal and a plurality of detection images used for operation detection, on the display surface, an imaging unit that captures the plurality of detection images displayed on the display surface, a detection unit that detects an operation on each of the plurality of detection images based on the image captured by the imaging unit; and a processing unit performs processing corresponding to the detection image from which the operation is detected by the detection unit. The display control unit causes plurality of detection images to be displayed at the outside of the input image on the display surface, and causes a plurality of identification images corresponding to each of the plurality of detection images to be displayed at the position corresponding to the detection image.

According to the aspect of the invention, the operation on each of the plurality of detection images is detected based on the captured image in which the plurality of detection images are captured and displayed on the display surface, and then, the processing corresponding to the detected operation is performed. Here, the plurality of detection images are displayed at the outside of the input image. Therefore, an influence on the detection image by the input image can be suppressed, and thus, it is possible to detect the operation on the detection image with high accuracy. In addition, a plurality of identification images respectively corresponding to each of the plurality of detection images are displayed at the position corresponding to the detection images. Therefore, it is possible to reduce an influence of the display of the plurality of detection images on the display of the input image, and thus, the processing relating to the detection image can be displayed in an easily understandable manner.

In the aspect of the invention, the display control unit may cause the display unit to display the plurality of detection images having the same appearances.

According to the aspect of the invention with this configuration, since the images having the same appearances are displayed as the plurality of detection images, a processing load can be reduced by making the conditions for detecting the operation common.

In the aspect of the invention, the display control unit may cause the display unit to display the detection image on a background color set in advance in a superimposed manner.

According to the aspect of the invention with this configuration, since the detection image is displayed on the background color set in advance in a superimposed manner, it is possible to improve a visibility of the detection image, and the display of the input image and the display of the detection image can be clearly distinguished.

In the aspect of the invention, in a case where a plural number of detection images are detected by the detection unit, at least a part of the processing items which are made to be performed by the processing unit corresponding to the detection images from which the operation is detected, may not be performed.

According to the aspect of the invention with this configuration, since at least a part of the processing is not performed in a case where the operation is detected from a plural number of detection images, it is possible to avoid an erroneous processing performed due to the detection of an erroneous operation.

In the aspect of the invention, the display device may further include a size measuring unit that measures a size of a display area on the display surface on which the display unit displays an image. The display control unit may change any one of a display position of the detection image on the display area, a display size of the detection image, and a display interval of the plurality of detection images based on the size of the display area measured by the size measuring unit.

According to the aspect of the invention with this configuration, since any one of the display position of the detection image, the display size of the detection image, and the display interval of the plurality of detection images are changed based on the size of the detected display area, it is possible to display the detection image on the suitable display position, at the suitable display size, and at the suitable display interval on the display area.

In the aspect of the invention, the display control unit may cause a display mode of an identification image corresponding to the detection image from which the operation is detected by the detection unit, to be changed.

According to the aspect of the invention with this configuration, since the display mode of the identification image corresponding to the detection image from which the operation is detected is changed, the user can distinguish the detection image from which the operation is detected from other detection images and can recognize.

In the aspect of the invention, the display control unit may cause the identification image to be displayed on the input image side of the detection image.

According to the aspect of the invention with this configuration, the identification image is displayed at the input image side of the detection image. Therefore, when the user located at the outside of the display surface operates the detection image, the user's hand does not overlap with the identification image, and thus, the visibility of the identification image is not decreased.

In the aspect of the invention, the processing unit may perform processing for changing a relative display position of the plurality of detection images with respect to the input image on the display surface according to the operation on any one of the detection images displayed by the display unit.

According to the aspect of the invention with this configuration, it is possible to change the relative display position of the plurality of detection images with respect to the input image by operating the detection image.

In the aspect of the invention, the display device may further include an interface unit that is connected to an external device. The display control unit may display the detection image corresponding to the processing performed by the external device in a case where the external device is connected to the interface unit, and may not display the detection image corresponding to the processing performed by the external device in a case where the external device is not connected to the interface unit.

According to the aspect of the invention with this configuration, in a case where the external device is connected to the interface unit, the detection image corresponding to the processing performed by the external device is displayed, and in a case where the external device is not connected to the interface unit, the detection image corresponding the processing performed by the external device is not displayed on the display surface. That is, since an invalid detection image is not displayed, the convenience for the user is improved.

In the aspect of the invention, the display device may further include an interface unit connected to an external device. The processing items performed by the processing unit according to the operation on any of the detection images displayed by the display unit may be different from each other in a case where the external device is connected to the interface unit and in a case where the external device is not connected to the interface unit.

According to the aspect of the invention with this configuration, the processing items performed in a case where the external device is connected to the interface unit and in a case where the external device is not connected to the interface unit are different from each other. Therefore, in a case where the external device is connected to the interface unit, for example, it is possible to cause the display device to perform the processing corresponding to the processing performed by the external device. In addition, in a case where the external device is not connected to the interface unit, it is possible to cause the display device to perform the processing which is independently performed by the display device.

Another aspect of the invention is directed to a method of controlling a display device that displays an image on a display surface. The method includes displaying an input image which is based on an input image signal and a plurality of detection images used for operation detection, on the display surface, capturing the plurality of detection images displayed on the display surface, detecting an operation on each of the plurality of detection images based on the captured image obtained by capturing the plurality of detection images, and performing processing corresponding to the detection image from which the operation is detected by the detection unit. A plurality of detection images are displayed at the outside of the input image on the display surface, and a plurality of identification images corresponding to each of the plurality of detection images are displayed at the position corresponding to the detection image.

According to the aspect of the invention, the operation on each of the plurality of detection images is detected based on the captured image in which the plurality of detection images are captured and displayed on the display surface, and then, the processing corresponding to the detected operation is performed. Here, the plurality of detection images are displayed at the outside of the input image. Therefore, an influence on the detection image by the input image can be suppressed, and thus, it is possible to detect the operation on the detection image which is displayed with high accuracy. In addition, the plurality of identification images respectively corresponding to each of the plurality of detection images are displayed at the position corresponding to the detection images. Therefore, it is possible to reduce an influence of the display of a plurality of detection images on the display of the input image, and thus, the processing relating to the detection image can be displayed in an easily understandable manner.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
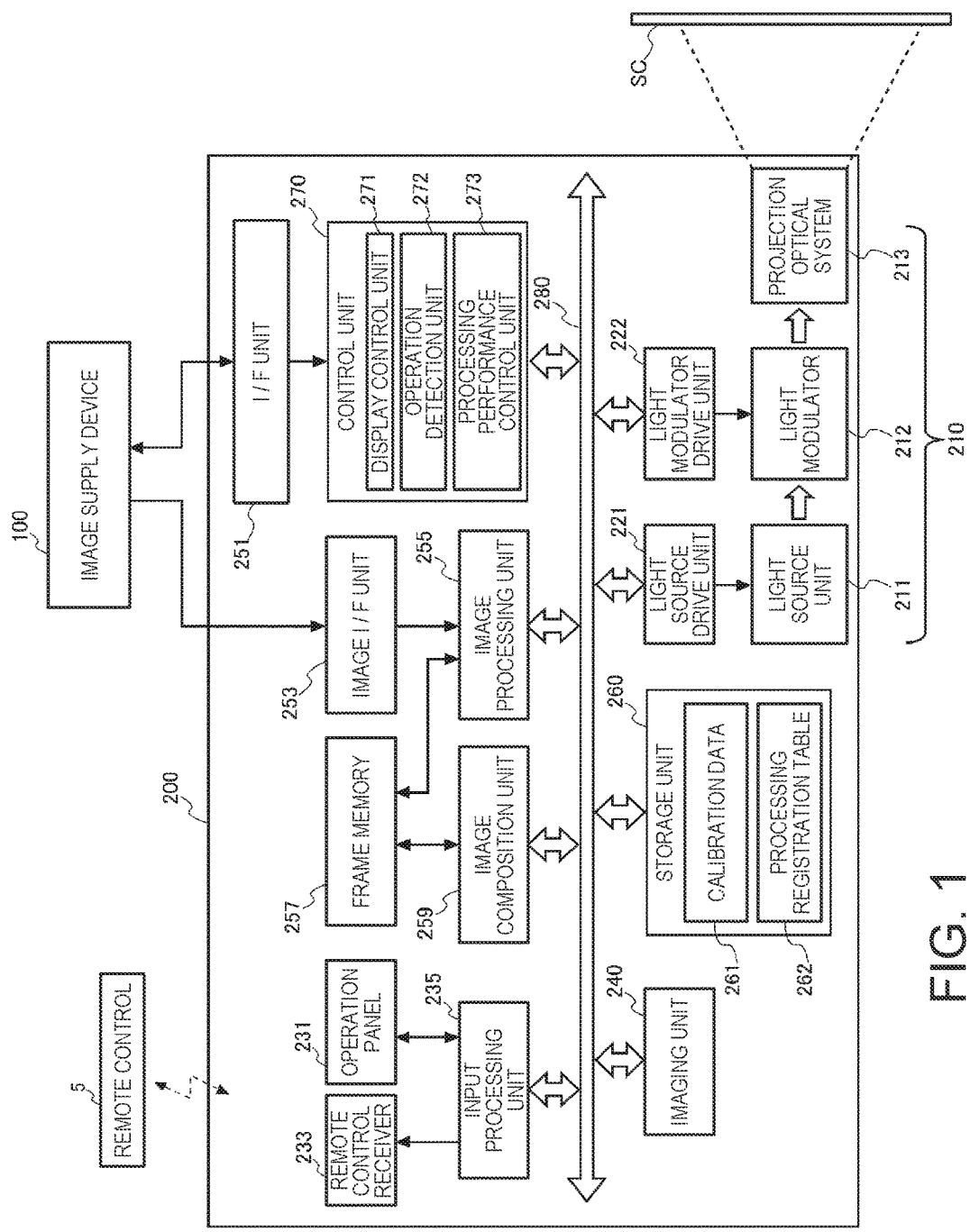
FIG. 1 is a configuration diagram of a projector.

Hereinafter, an exemplary embodiment of the invention will be described referring to the drawings.

FIG. 1 is a configuration diagram of a projector 200.

The projector 200 is connected to an image supply device 100, and projects an image to a projection target based on an image signal supplied from the image supply device 100. In addition, the projector 200 may read image data stored in a built-in storage unit 260 or in an externally connected storage medium, and may display the image on a screen SC based on the read image data.

In the present exemplary embodiment, the screen SC is the projection target. The screen SC corresponds to a "display surface" according to the invention. The screen SC is configured as a plane surface or a film, and the specific shape is arbitrary. Other than the screen SC, the projection target may be uniform plane surfaces such as a wall surface, a ceiling surface, a floor surface, or a whiteboard. In addition, the projection target may be a non-flat surface such as an outside wall of a building.

In addition, aspects of using the projector 200 may be any one of a front projection type projection method in which image light is projected from the front to the screen SC or a rear projection type projection method in which the image light is projected to the rear surface of the transmission type screen SC.

As the image supply device 100, for example, a notebook PC (personal computer), a desktop PC, a tablet terminal, a smart phone, a personal digital assistant (PDA), or the like can be used. In addition, as the image supply device 100, a video reproduction device, a digital versatile disk (DVD) player, a Blu-ray disc player, a TV tuner device, a set top box of CATV (Cable television), a video game machine, or the like may be used. The image supply device 100 generates an image signal and supplies the image signal to the projector 200. The image supply device 100 can be configured to be built in the projector 200.

The projector 200 includes an interface unit (hereinafter, abbreviated as an I/F unit) 251 and an image interface unit (hereinafter, abbreviated as an image I/F unit) 253 as interfaces connected to an external device. The I/F unit 251 and the image I/F unit 253 are provided with connectors for wired connection, and include interface circuits corresponding to the connectors. In addition, the I/F unit 251 and the image I/F unit 253 may include wireless communication interfaces. Examples of the connectors for wired connection and the interface circuits may be those compliant with wired LAN, IEEE 1394, USB, or the like. In addition, examples of the wireless communication interface may be those compliant with wireless LAN®, Bluetooth®, Miracast®, WiDi®, AirPlay®, Ultra Wide Band (UWB), or the like.

In addition, the image I/F unit 253 may be an interface for image data such as MHL®, HDMI®, DisplayPort, or the like. In addition, the image I/F unit 253 is provided with a connector such as a VGA terminal that can input an analog image signal as a connector, and may include an A/D conversion circuit that converts an analog image signal input via the connector into digital data. Furthermore, the image I/F unit 253 may include an interface to which voice data is input.

The I/F unit 251 is an interface that transmits and receives various data items such as control data items to and from the image supply device 100. A control unit 270 described below has a function of transmitting and receiving the data items to and from the external image supply device 100 via the I/F unit 251.

The image I/F unit 253 is an interface to which the image signal transmitted from the image supply device 100 is input. The image I/F unit 253 demodulates the received image signal and extracts image data, and outputs the extracted image data to an image processing unit 255. The image data may be moving image data or may be still image data.

In the illustration in FIG. 1, the I/F unit 251 and the image I/F unit 253 are connected to the same image supply device 100 which is the external device, however, the I/F unit 251 and the image I/F unit 253 may be connected to external devices different from each other. For example, the image I/F unit 253 may be connected to the image supply device 100 that supplies the image, and the I/F unit 251 may be connected to a control device such as a personal computer that controls the projector 200. Each of the I/F unit 251 and the image I/F unit 253 may be provided in plural. In addition, in the configuration in which the plurality of image I/F units 253 are included, a plurality of images supplied from a plurality of image supply devices 100 may be simultaneously displayed in one screen.

The projector 200 performs optical image formation and includes a display unit 210 that projects the image to the screen SC.

The display unit 210 includes a light source unit 211, light modulator 212 and the projection optical system 213.

The light source unit 211 includes a light source such as a xenon lamp, a super high pressure mercury lamp, a light emitting diode (LED), or a laser light source. In addition, the light source unit 211 may include a reflector and an auxiliary reflector that guide the light emitted from the light source to the light modulator 212. Furthermore, the light source unit 211 may include a lens group for improving the optical characteristics of the projected light, a polarizer plate, or a dimmer element for reducing the amount of light emitted from the light source on the path leading to the light modulator 212 (all are not illustrated).

The light source unit 211 is driven by a light source drive unit 221. The light source drive unit 221 is connected to an internal bus 280 and turn on and turn off the light source in the light source unit 211 according to the control by the control unit 270 connected to the same internal bus 280.

The light modulator 212 includes, for example, three liquid crystal panels corresponding to three primary colors of RGB. The light emitted from the light source unit 211 is separated into three color lights of RGB, and the three color lights are respectively incident on the corresponding liquid crystal panels. The three liquid crystal panels are transmission type liquid crystal panels, and modulate the transmitted light to generate the image light. The image light obtained by modulating the light passed each liquid crystal panel is composed by a composition optical system such as a cross dichroic prism, and then, the result is projected to the projection optical system 213.

The light modulator 212 is driven by a light modulator drive unit 222. The light modulator drive unit 222 is connected to the internal bus 280.

Superimposed image data corresponding to each primary color of R, G, and B is input to the light modulator drive unit 222 from an image composition unit 259. Details of the superimposed image data will be described below. The light modulator drive unit 222 converts the input superimposed image data into a data signal suitable for an operation of the liquid crystal panels. The light modulator drive unit 222 applies a voltage to each pixel of each liquid crystal panel based on the data signal obtained by the conversion, and then, draws an image on each liquid crystal panel.

The projection optical system 213 includes a lens group that projects the image light obtained by modulating the light by the light modulator 212 on the screen SC to form an image on the screen SC. In addition, the projection optical system 213 may include a zoom mechanism that enlarges or reduces the image projected on the screen SC or a focus adjustment mechanism that performs the focus adjustment.

The projector 200 includes an operation panel 231, a remote control receiver 233 and an input processing unit 235. The operation panel 231 and the remote control receiver 233 are connected to the input processing unit 235 which is connected to the internal bus 280.

Various operation keys for operating the projector 200 are provided in the operation panel 231. A power key for instructing the projector 200 to power-on or power-off, a menu key for performing various settings, and the like are provided in the operation panel 231. When the operation key is operated, the input processing unit 235 outputs an operation signal corresponding to the operated key to the control unit 270.

In addition, the projector 200 includes a remote control 5 that is used by a user. The remote control 5 includes various buttons, and transmits an infrared signal according to the operation of those buttons.

The remote control receiver 233 receives the infrared signal transmitted from the remote control 5. The input processing unit 235 decodes the infrared signal received by the remote control receiver 233, and generates an operation signal indicating the operation content in the remote control 5 and outputs the operation signal to the control unit 270.

The projector 200 includes an imaging unit 240. The imaging unit 240 includes an imaging element (not illustrated) such as a charge coupled device (CCD) or a complementary metal oxide semiconductor (CMOS), and images the screen SC as a subject. An imaging direction of the imaging unit 240 is same or substantially same as the direction of the projection optical system 213, and an imaging range of the imaging unit 240 covers the range in which the projection optical system 213 projects the image on the screen SC. The imaging unit 240 stores the image data imaged using the visible light in the storage unit 260.

The projector 200 includes an image processing system. The image processing system is mainly configured with the control unit 270 that integrally controls the entire projector 200, and additionally includes an image processing unit 255, a frame memory 257, an image composition unit 259, and a storage unit 260. The control unit 270, the image processing unit 255, the image composition unit 259, and the storage unit 260 are connected to each other through internal bus 280 so as to perform data communication with each other.

The image processing unit 255 develops the image data input from the image I/F unit 253 to the frame memory 257 for performing processing. The processing items performed by the image processing unit 255 include, for example, resolution conversion (scaling) processing or resizing processing, shape correction processing such as distortion correction, digital zoom processing, color tone correction processing, luminance correction processing, and the like. The image processing unit 255 performs the processing designated by the control unit 270 and performs the processing using a parameter input from the control unit 270, if necessary. In addition, of course, the image processing unit 255 can perform the combination of a plurality of processing items described above. The image processing unit 255 outputs the processing-completed image data to the image composition unit 259.

The image composition unit 259 develops the image data input from the image processing unit 255 to the frame memory 257. In addition, in a case where drawing data (OSD data) is input from the control unit 270, the image composition unit 259 superimposes the input drawing data to the image data developed to the frame memory 257 according to the control by the control unit 270. The drawing data will be described below. The image composition unit 259 reads the data in which the drawing data is superimposed on the image data from the frame memory 257, and outputs the data to the light modulator drive unit 222 as the superimposed image data.

The storage unit 260 is, for example, an auxiliary storage device such as a hard disk device. The storage unit 260 may be replaced by an optical disk such as a dynamic RAM (DRAM), a flash memory or a compact disc (CD) capable of storing large amount of information items, a digital versatile disc (DVD), a Blu-ray® disc (BD). The storage unit 260 stores a control program executed by the control unit 270 and various data items. In addition, storage unit 260 stores image data items such as a first pattern image 310 and a second pattern image 320 described below in addition to the captured image data captured by the imaging unit 240.

In addition, the storage unit 260 stores calibration data 261.

The calibration data 261 is data obtained by a calibration performed before shipment of the projector 200. The calibration data 261 is data for deriving a size of the projection area on the screen SC from information (imaging position information) on a position and a size of the pattern image on the image data obtained by capturing a predetermined projected pattern image, and is a determinant representing a relationship between a zoom ratio of the zoom lens included in the projection optical system 213, a distance (installation distance) to the screen SC from the projector 200, and imaging position information that changes according to the above described zoom ratio and the distance. The calibration data 261 is stored in the storage unit 260. The projection area indicates an area occupied by the entire image projected by the projector 200 on the screen SC.

In the calibration, two images prepared in advance are projected on the screen SC while changing the projection conditions (the zoom ratio and the installation distance) of the projector 200. In addition, the first pattern image 310 illustrated in FIG. 2 and the second pattern image 320 illustrated in FIG. 3 are included in the two images prepared in advance. The first pattern image 310 and the second pattern image 320 are not limited to be stored in the storage unit 260 in advance, and may be generated every time according to the control program.

Figure 2:
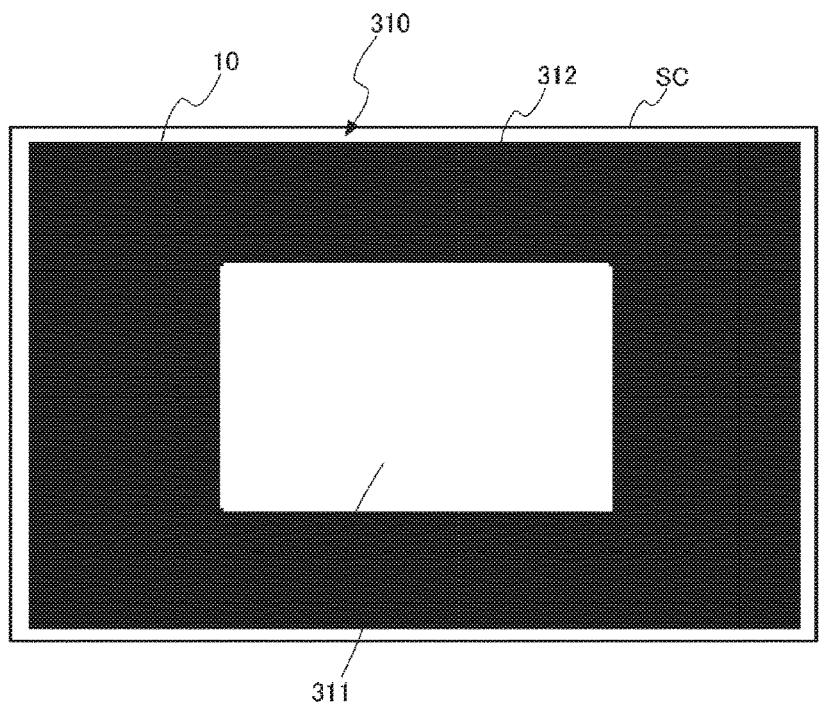
FIG. 2 is a diagram illustrating a first pattern image.
Figure 3:
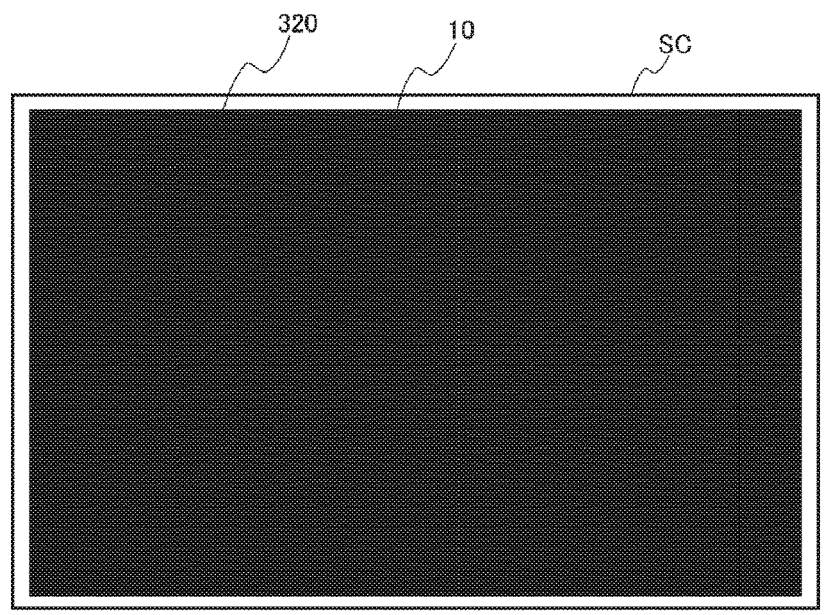
FIG. 3 is a diagram illustrating a second pattern image.

FIG. 2 illustrates the first pattern image 310 projected on a projection area 10 on the screen SC.

The first pattern image 310 is a rectangular image and includes a first area 311 and a second area 312. The first area 311 is a rectangular area arranged at the center portion of the first pattern image 310. In the present exemplary embodiment, a white image is used as the first area 311. In addition, the second area 312 is an area arranged around the first area 311 so as to surround the first area 311. In the present exemplary embodiment, a black image is used as the second area 312. In the present exemplary embodiment, the first area 311 is described to be the rectangular area. However, the shape of the first area 311 is not limited to the rectangular shape. In addition, in the present exemplary embodiment, the first area 311 is the white image and the second area 312 is the black image. However, the colors of the first area 311 and the second area 312 are not limited to those colors. As described below, the image of any colors may be used as long as the position and the range of the first area 311 can be recognized on the captured image data by obtaining a difference between the captured image data in which the first pattern image 310 is captured and the captured image data in which the second pattern image 320 is captured.

An example of the second pattern image 320 projected on the projection area 10 on the screen SC is illustrated in FIG. 3. The second pattern image 320 is a rectangular black image, and an image size and an aspect ratio of the second pattern image 320 are the same as those of the first pattern image 310.

When the captured image data items of the first pattern image 310 and the second pattern image 320 are generated, the control unit 270 calculates a difference between the captured image data of the first pattern image 310 and the captured image data of the second pattern image 320. In addition, the control unit 270 compares the calculated difference with a threshold value to specify the first area 311. Furthermore, the control unit 270 obtains coordinates of four vertices which are four corner points of the specified first area 311. The coordinates of four vertices are coordinates in the imaging coordinate system. The imaging coordinate system is a coordinate system of the imaging element included in the imaging unit 240. The imaging element has a structure in which a plurality of light receiving elements are two-dimensionally arrayed in the horizontal direction and the vertical direction. The imaging coordinate system represents the coordinates in the horizontal direction and the vertical direction for identifying the light receiving elements.

When the coordinates of four vertices are obtained under a plurality of projection conditions (a plurality of zoom ratios and a plurality of installation distances), the control unit 270 derives a determinant representing a relationship between the coordinates obtained for four vertices and the projection conditions, and stores the determinant in the storage unit 260 as the calibration data 261.

In addition, the storage unit 260 stores a processing registration table 262.

In the processing registration table 262, information (marker identification information) for identifying an operation detection marker 305 described below and information (processing information) for indicating the processing performed by the projector 200 in a case where the operation detection marker 305 is selected, are stored in association with each other. The marker identification information is information (for example, numbers) individually assigned to each operation detection marker 305 for identifying each of a plurality of operation detection markers 305. The operation detection marker 305 is an image displayed based on the drawing data, and corresponds to a "detection image" according to the invention. The processing registration table 262 may be generated by a control program instead of being stored in the storage unit 260.

The control unit 270 includes a CPU, a ROM and a RAM (all are not illustrated) as hardware. The ROM is a nonvolatile storage device such as a flash ROM and stores the control program and the data. The RAM constitutes a work area of the CPU. The CPU develops the control program read from the ROM in the RAM, executes the developed control program, and controls each unit of the projector 200.

The control unit 270 includes a display control unit 271, an operation detection unit 272, and a processing performance control unit 273 as functional blocks. These functional blocks are realized by executing the control program developed to the RAM.

The display control unit 271 controls each unit of the projector 200 and displays a projection image on the screen SC.

Specifically, the display control unit 271 causes the image processing unit 255 to process the image data received by the image I/F unit 253. At this time, the display control unit 271 may read a parameter from the storage unit 260 necessary for the processing by the image processing unit 255 and may output to the image processing unit 255.

In addition, the display control unit 271 controls the image composition unit 259 to cause the image composition unit 259 to perform the processing for compositing the image data and the drawing data. In addition, the display control unit 271 controls the light modulator drive unit 222 to cause the liquid crystal panel of the light modulator 212 to draw the image. Furthermore, the display control unit 271 controls the light source drive unit 221 to turn on the light source of the light source unit 211 and to adjust the brightness of the light source. In this way, the image light emitted from the light source and modulated by the light modulator 212 is projected on the screen SC by the projection optical system 213.

The operation detection unit 272 detects an operation on the operation detection marker 305 based on the captured image data captured by the imaging unit 240. The operation detection unit 272 in the present exemplary embodiment detects an operation (hereinafter, referred to as "selection operation") of selecting the operation detection marker 305 as the operation on the operation detection marker 305.

The processing performance control unit 273 causes the projector 200 to perform the processing associated with the operation detection marker 305 of which the operation is detected by the operation detection unit 272.

Details of the operations of the display control unit 271, the operation detection unit 272, and the processing performance control unit 273 will be described referring to FIG. 4. The display control unit 271 corresponds to "a display control unit and a size measuring unit" according to the invention. The operation detection unit 272 corresponds to a "detection unit" according to the invention. In addition, the processing performance control unit 273 corresponds to a "processing unit" according to the invention.

Figure 4:
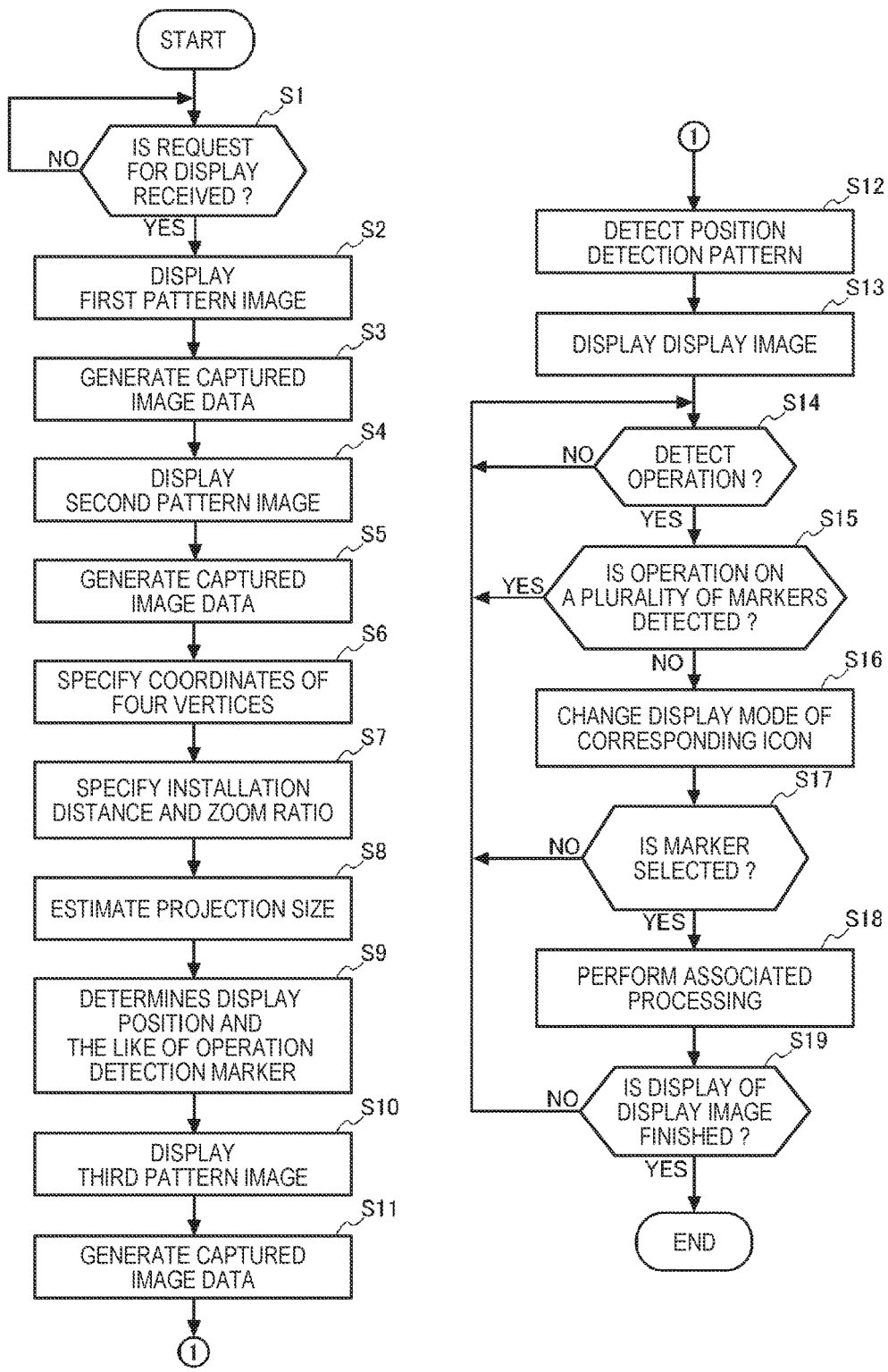
FIG. 4 is a flowchart illustrating an operation of the control unit.

FIG. 4 is a flowchart illustrating the operation of the control unit 270.

First, the display control unit 271 determines whether or not a request for displaying the operation detection marker 305 (refer to FIG. 5) is received from the remote control 5 or the operation panel 231 (STEP S1). The operation detection marker 305 is a detection image for detecting an operation from the user, and is projected on the screen SC together with an image (hereinafter, referred to as an input image) which is based on the image data supplied from the image supply device 100.

Figure 5:
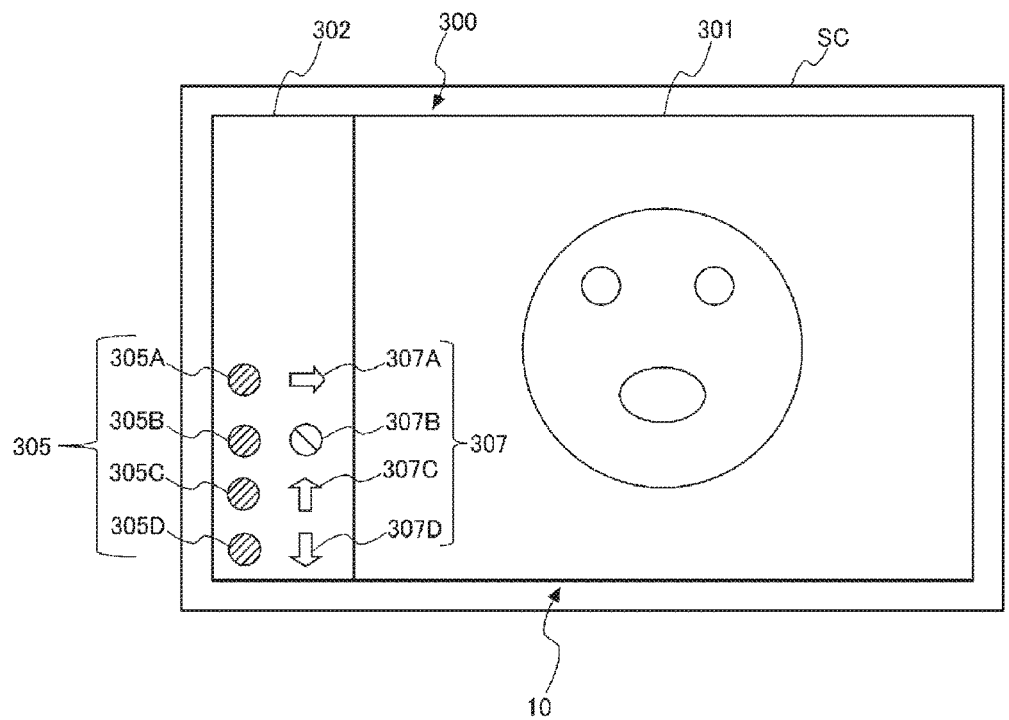
FIG. 5 is a diagram illustrating a display image in which an operation detection area is displayed at a left end of a projection area.

FIG. 5 is a diagram illustrating an example of a display image 300 projected on the projection area 10 on the screen SC.

An image display area 301 and an operation detection area 302 are formed in the display image 300. The image display area 301 is an area that occupies most of the projection area 10, and is an area where the input image is displayed. The operation detection area 302 is an area displayed at the end portion of the projection area 10. That is, the operation detection area 302 is displayed at the outside of the image display area 301, and operation detection marker 305 displayed in the operation detection area 302 is also displayed at the outside of the image display area 301. In the description in FIG. 5, the operation detection area 302 is displayed at the left end of the projection area 10, however, the display position of the operation detection area 302 is not limited to the left end. For example, the operation detection area 302 may be projected at the right end of the projection area 10, or may be projected on an upper end portion or the lower end portion of the projection area 10.

A plurality of operation detection markers 305 and a plurality of icons 307 are displayed in the operation detection area 302. The icon 307 is an image displayed based on the drawing data, and corresponds to an "identification image" according to the invention.

The plurality of operation detection marker 305 and the plurality of icon 307 are displayed so as to be superimposed to a preset background color. In the present exemplary embodiment, black is used as the background color. By displaying the plurality of operation detection marker 305 and the plurality of icon 307 in the operation detection area 302 so as to be superimposed to the black background color, it is possible to clearly distinguish the image display area 301 and the operation detection area 302.

The number of operation detection markers 305 displayed in the operation detection area 302 is arbitrary. That is, the number of operation detection markers 305 may be one or may be plural numbers. FIG. 5 illustrates a case where four operation detection markers 305 of 305A, 305B, 305C and 305D are displayed in the operation detection area 302 in a vertically aligned manner. The number of processing items performed by the projector 200 increases as the number of operation detection markers 305 displayed in the operation detection area 302 increases.

In addition, in a case where a plurality of operation detection markers 305 are displayed in the operation detection area 302, images having the same appearances are used for the images representing the operation detection markers 305. In the present exemplary embodiment, images having the same shape, the same size, and the same pattern (color) are used for the images of the operation detection markers 305. By using the images having the same shape, the same size, and the same pattern (color) are used for the images representing the plurality of operation detection markers 305, the threshold value used for detecting the operation on the operation detection marker 305 can be made common, and thus, it becomes easy to detect the operation on the operation detection marker 305.

FIG. 5 illustrates a case where white circular images are used for the images representing the operation detection markers 305A to 305D.

In addition, a plurality of icons 307 displayed in the operation detection area 302 are images representing a pattern, a picture, a symbol, a letter, or the like indicating processing items associated with the operation detection markers 305. FIG. 5 illustrates a case where four icons 307A, 307B, 307C and 307D are displayed as the plurality of icons 307.

The plurality of icons 307 are displayed at the positions corresponding to the plurality of operation detection marker 305 respectively. Specifically, the icons 307 are arrayed in the vicinity of the operation detection markers 305 to which the processing indicated by the icon 307 is assigned, and at the position not overlapping the operation detection markers 305. In the example illustrated in FIG. 5, the icon 307A indicating the processing assigned to the operation detection marker 305A is displayed at the right side of the operation detection marker 305A. Similarly, the icon 307B is displayed at the right side of the operation detection marker 305B, the icon 307C is displayed at the right side of the operation detection marker 305C, and the icon 307D is displayed at the right side of the operation detection marker 305D. Here, the right side of the operation detection marker 305 is the image display area 301 side (input image side), and is internal side of the display image 300.

Since the shapes and sizes of the images representing the plurality of operation detection markers 305A to 305D are common, the user cannot recognize the processing items associated with the operation detection markers 305A to 305D only by seeing the images of the operation detection markers 305. Therefore, by displaying the plurality of icons 307 representing the processing items associated with each operation detection marker 305 near each of the plurality of operation detection markers 305, it becomes possible to recognize the processing items associated with the operation detection markers 305.

In the present exemplary embodiment, the projector 200 displays the operation detection markers 305 on the screen SC, and detects the operation of selecting the displayed operation detection markers 305. When the operation detection marker 305 is selected by the user, the projector 200 performs the processing associated with the selected operation detection marker 305.

For example, processing for changing the relative display position of the operation detection area 302 with respect to the image display area 301 in the projection area 10 according to the operation on the operation detection marker 305A is assigned to the operation detection marker 305A illustrated in FIG. 5. In the processing registration table 262 stored in the storage unit 260, the marker identification information representing the operation detection marker 305A and the change of the display position as the information indicating a content of the processing to be performed (processing information), are registered in association with each other.

Figure 6:
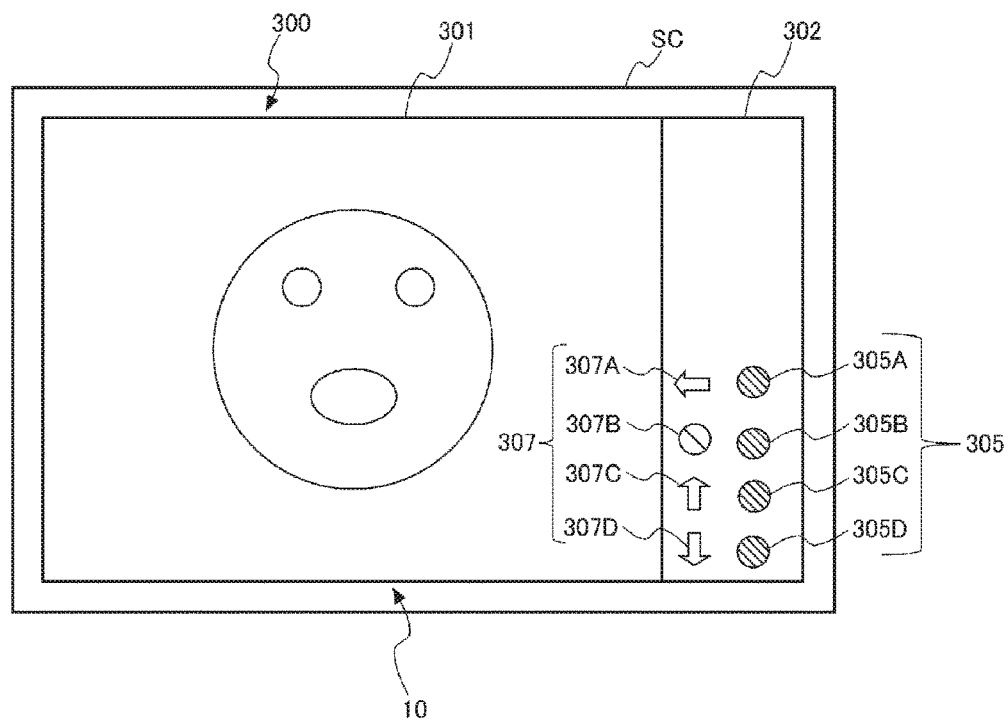
FIG. 6 is a diagram illustrating a display image in which an operation detection area is displayed at a right end of the projection area.

In a case where it is determined that the operation detection marker 305A is selected, the operation detection unit 272 acquires the processing information associated with the marker identification information and outputs the information to the processing performance control unit 273 referring to the processing registration table 262 which is based on the marker identification information of the selected operation detection marker 305A. The processing performance control unit 273 performs the processing according to the input processing information. Specifically, the processing performance control unit 273 changes the relative position of the operation detection area 302 with respect to the image display area 301 on the liquid crystal panel in the light modulator 212. FIG. 6 illustrates a case where the processing associated with the operation detection marker 305A is performed and display position of the operation detection area 302 is changed to the right end from the left end of the projection area 10. In this case, the icons 307 are displayed at the left side (internal side) of the operation detection marker 305. In addition, the pattern of the icon 307A which is the rightward arrow is changed to the leftward arrow. Instead of the operation detection unit 272 acquiring the processing information referring to the processing registration table 262 and outputting the processing information to the processing performance control unit 273, the operation detection unit 272 may output the marker identification information to the processing performance control unit 273 and the processing performance control unit 273 may acquire the processing information referring to the processing registration table 262.

Other than the processing described above, the processing associated with the operation detection marker 305 includes processing for performing and releasing the AV (Audio Visual) mute to stop the projection of the image and the outputting of the voice to the screen SC, processing for page-up and page-down, or the like. The processing for page-up and page-down is processing for scrolling the pages of a document up and down in a case where the image projected on the screen SC by the projector 200 is an image of the document generated by presentation software, word processing software, or spreadsheet software. The processing associated with the operation detection marker 305 is not limited to the processing described above, and various functions included in the projector 200 and the image supply device 100 may be adopted.

In a case where the determination in STEP S1 is negative (NO in STEP S1), the display control unit 271 waits for the performance of processing items in the flow chart illustrated in FIG. 4 until an instruction to display the operation detection marker 305 is received, and performs another processing.

In addition, in a case where the determination in STEP S1 is positive (YES in STEP S1), the display control unit 271 displays the first pattern image 310 on the screen SC in order to detect the projection conditions and estimate the size of the projection area 10 (STEP S2). The display control unit 271 reads the image data of the first pattern image 310 from the storage unit 260, outputs the read image data to the image composition unit 259, and causes the display unit 210 to display the first pattern image 310 on the screen SC.

When the first pattern image 310 is projected on the screen SC, the display control unit 271 performs exposure control (adjusting the exposure) such that the captured image has an appropriate exposure and causes the imaging unit 240 to image the screen SC direction to generate the captured image data (STEP S3). The display control unit 271 causes the storage unit 260 to store the captured image data generated by the imaging unit 240.

Next, the display control unit 271 displays the second pattern image 320 on the screen SC (STEP S4). When the second pattern image 320 is projected on the screen SC, the display control unit 271 causes the imaging unit 240 to image the screen SC direction at the exposure same as that of capturing the first pattern image 310 to generate the captured image data (STEP S5). The display control unit 271 causes the storage unit 260 to store the captured image data generated by the imaging unit 240.

Next, the display control unit 271 calculates the difference between the captured image data of the first pattern image 310 and the captured image data of the second pattern image 320 to extract the first area 311, and then, specifies the coordinates of four vertices at four corners of the first area 311 (STEP S6). Here, the specified coordinates of four vertices are coordinates in the imaging coordinate system.

Next, the display control unit 271 obtains the size of the projection area 10 on the screen SC using the specified coordinates of four vertices and the calibration data 261. In the present exemplary embodiment, first, the display control unit 271 performs the calculation on the specified coordinates of four vertices by using the calibration data 261 (determinant), and then, specifies the installation distance and the zoom ratio which are the projection conditions (STEP S7).

Next, the display control unit 271 estimates the size (hereinafter, projection size) of the projection area 10 based on the specified installation distance and the zoom ratio (STEP S8). For example, if the projection size (reference projection size) in a case where an optical axis of the projection optical system 213 is orthogonal to the screen SC is stored in the storage unit 260 in advance at a predetermined installation distance and a predetermined zoom ratio, the display control unit 271 can calculate the projection size by calculating the specified installation distance and the zoom ratio and the reference projection size in a case where the optical axis of the projection optical system 213 is orthogonal to the screen SC. In addition, if the information on the projection size is stored in the storage unit 260 in association with the installation distance and the zoom ratio, the display control unit 271 can estimate the projection size referring to the storage unit 260 based on the specified installation distance and the zoom ratio. In a case where the optical axis of the projection optical system 213 is not orthogonal to the screen SC and processing for correcting a trapezoidal distortion occurred caused thereby is performed, the projection size may be calculated while adding the correction processing.

When the projection size is estimated, the display control unit 271 determines the display position and a display size of the operation detection marker 305 in the projection area 10 and a display interval for the plurality of operation detection markers 305 based on the estimated projection size (STEP S9). The display position, the display size, and the display interval of the operation detection markers 305 determined here are the display position, the display size, and the display interval of the operation detection markers 305 to be displayed in STEP S13 described below. Here, the display position is position of all the plurality of operation detection markers 305, the display size is the size of each operation detection marker 305, and the display interval is a distance between the reference points (for example, a center or a center of gravity) of the adjacent operation detection markers 305. For example, by storing information (setting information) in which the display position, the display size, and the display interval of the operation detection marker 305 are set in association with the projection size in the storage unit 260 in advance, the display control unit 271 determines the display position, the display size, and the display interval based on the setting information corresponding to the estimated projection size. Specifically, in a case where the projection size is large, since there is a possibility that a hand does not reach the upper side of the projection area 10, the setting information can be made in such a manner that entire of the operation detection marker 305 is displayed at the lower side of the projection area 10 as the projection size increases. In addition, the size and the interval of the operation detection marker 305 in the setting information become small as the projection size increases. Therefore, it is possible to realize an environment easy for the user to operate. The display position, the display size, and the display interval of the operation detection marker 305 may be configured to be switched in two stages according to whether the projection size is equal to or larger than the predetermined threshold value or smaller than the predetermined threshold value, or may be configured to be changed in multi-stages (equal to or more than three stages) according to the projection size.

When the setting information on the operation detection marker 305 corresponding to the projection size is acquired from the storage unit 260, the display control unit 271 generates a third pattern image 330 and displays the third pattern image on the screen SC based on the acquired setting information (STEP S10).

Figure 7:
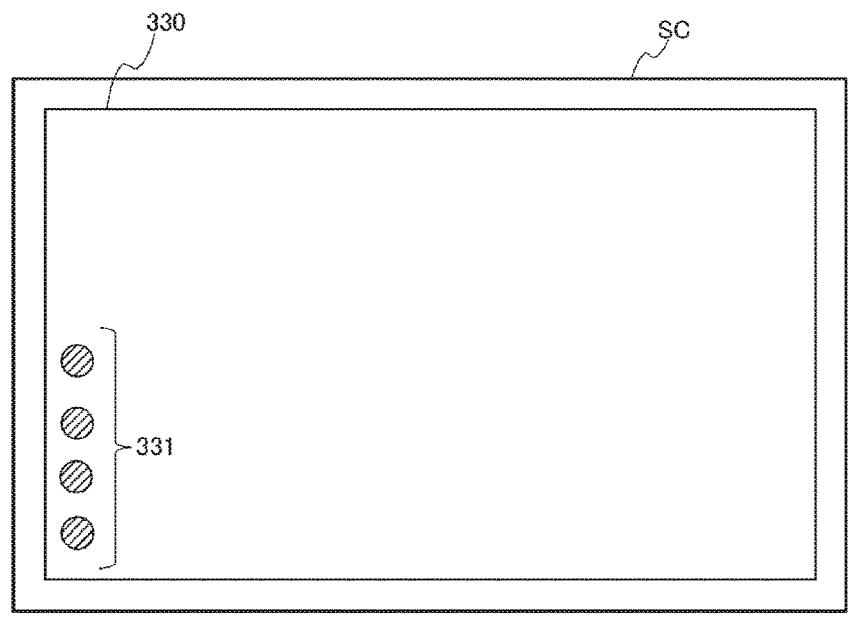
FIG. 7 is a diagram illustrating a third pattern image.

FIG. 7 is a diagram illustrating an example of third pattern image 330.

The third pattern image 330 is an image for specifying the position of the operation detection marker 305 projected on the screen SC. A position detection pattern 331 is displayed in the third pattern image 330. In the third pattern image 330, the display position, the display size, and the display interval in the position detection pattern 331 are the same as the display position, the display size, and the display interval of the operation detection marker 305 determined in STEP S9. The image representing the position detection pattern 331 may be any image as long as the image of the position detection pattern 331 can be specified in the captured image data in which the third pattern image 330 is captured, and the color, the shape, and the size may be arbitrary. For example, the position detection pattern 331 has the white circular shape same as the operation detection marker 305, and can be an image having a brightness distribution which becomes gradually dark from the center (center of gravity) toward the periphery such that the center of gravity position can easily be specified. In order to make the image of the position detection pattern 331 be easily detected, the size of the position detection pattern 331 may be larger than the size of the operation detection marker 305 acquired from the storage unit 260.

When the third pattern image 330 is displayed on the screen SC, the display control unit 271 causes the imaging unit 240 to image the screen SC direction to generate the captured image data (STEP S11). The display control unit 271 causes the storage unit 260 to store the captured image data captured by the imaging unit 240.

Next, the display control unit 271 reads the captured image data from the storage unit 260 and detects the image of the position detection pattern 331 from the captured image data (STEP S12). Subsequently, the display control unit 271 specifies the center of gravity position of the detected position detection pattern 331 and this position is set as a detection position when the operation is detected on the operation detection marker 305. The operation detection marker 305 displayed thereafter is displayed such that the center of gravity position coincides with the center of gravity position of the position detection pattern 331.

Next, the display control unit 271 determines the display position and the size of the icon 307 to be displayed on the display image 300 based on the determined display position and the size of the operation detection marker 305. In addition, the display control unit 271 determines the size and display position of the operation detection area 302 and the size and display position of the image display area 301 based on the determined display position and size of the operation detection marker 305 or the icon 307. The display control unit 271 outputs the determined information to the image composition unit 259.

The image composition unit 259 develops the image data input from the image processing unit 255 and the drawing data that is the image data of the operation detection marker 305 or the icon 307 to the frame memory 257 based on the information input from the display control unit 271.

That is, the image composition unit 259 develops the image data input from the image processing unit 255 to the position on the frame memory 257 determined by the display control unit 271. In addition, the image composition unit 259 develops the drawing data of the operation detection marker 305 or the icon 307 to the position on the frame memory 257 determined by the display control unit 271.

When the image data and the drawing data of the operation detection marker 305 or the icon 307 are developed to the frame memory 257, the image composition unit 259 reads the developed data and outputs the data to the light modulator drive unit 222 as the superimposed image data. By the light modulator drive unit 222 generating the data signal based on the superimposed image data and drawing the image based on the data signal on the liquid crystal panel, the light emitted from the light source unit 211 is modulated and the display image 300 is displayed on the screen SC (STEP S13).

When the display image 300 is projected on the screen SC, the operation detection unit 272 detects the operation on the operation detection marker 305 based on the captured image data generated by the imaging unit 240 at a certain interval (STEP S14).

Figure 8:
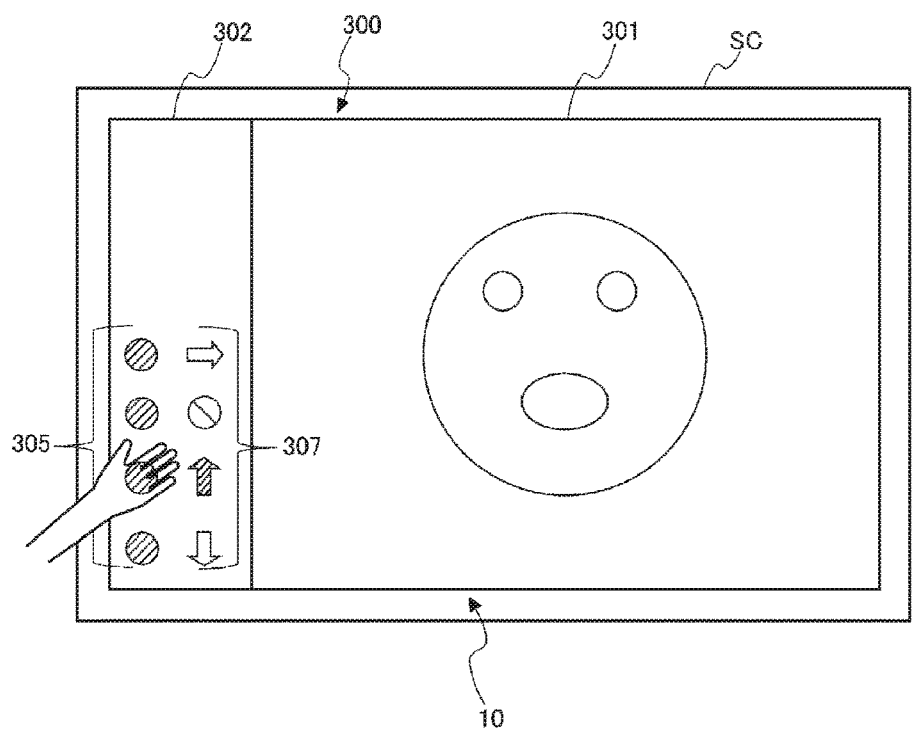
FIG. 8 is a diagram illustrating a method of operation on an operation detection marker.

FIG. 8 is a diagram illustrating a method of operation on an operation detection marker 305 displayed in the display image 300.

The user selects one operation detection marker 305 from a plurality of operation detection markers 305 displayed on the operation detection area 302 in the display image 300, and overlaps the user's hand or finger on the position of the selected operation detection marker 305.

The operation detection unit 272 determines whether or not the user's hand or finger overlaps the operation detection marker 305 based on the captured image data by the imaging unit 240. In a case where it is determined that the user's hand or finger overlaps the operation detection marker 305, the operation detection unit 272 determines that the operation on the operation detection marker 305 is performed.

Every time the captured image data from the imaging unit 240 is updated, the operation detection unit 272 extracts the detection position (the center of gravity position of the position detection pattern 331 and the operation detection marker 305) of the operation detection marker 305 and the pixel value of the pixel in the area in the vicinity of the position. The operation detection unit 272 compares the pixel values of the pixels extracted from a plurality of captured image data items, and detects the operation on the operation detection marker 305. Hereinafter, the detection position of the operation detection marker 305 and the area in the vicinity of the detection position will be referred to as an extraction area. The number of pixels included in the extraction area is not limited to the plural number, but may be only one pixel of the detection position.

Figure 9:
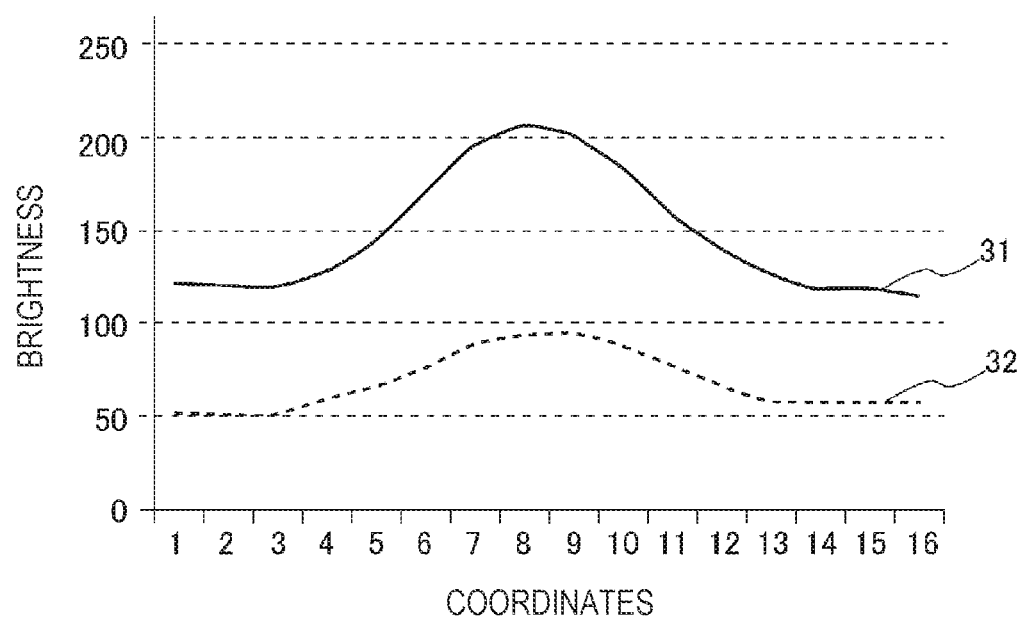
FIG. 9 is a graph illustrating a relationship between coordinates on the captured image data and brightness.

FIG. 9 is a graph illustrating a relationship between the coordinates on the captured image data and the brightness.

A curved line 31 illustrated in FIG. 9 with a solid line indicates a brightness value of the pixels in the extraction area. In addition, a curved line 32 illustrated in FIG. 9 with a dashed line indicates a brightness value of the pixels in the extraction area in a case where the user's hand overlaps. As is apparent by comparing the curved line 31 and the curved line 32, when the user's hand overlaps the operation detection marker 305, the brightness value of the pixels in the extraction area decreases.

The operation detection unit 272 compares the pixel value of the pixels in the extraction area extracted in the previous captured image data and the pixel value of the pixels in the extraction area extracted in the current captured image data, and then, determines whether or not the operation is performed on the operation detection marker 305.

For example, the operation detection unit 272 obtains the pixels at the detection position among the pixels in the extraction area from each of the current captured image data and the previous captured image data. The operation detection unit 272 may compare the brightness value of the pixels at the detection position, and then, determine whether or not the operation is performed on the operation detection marker 305. In addition, the operation detection unit 272 obtains a sum or an average value of the brightness value of the pixels in the extraction area from each of the previous captured image data and the current captured image data. The operation detection unit 272 may compare the obtained sum or average value of the brightness value, and then, determine whether or not the operation is performed on the operation detection marker 305.

In addition, the operation detection unit 272 compares the captured image data items captured at different timings from the captured image data items sequentially updated by the imaging unit 240, and detects the operation on the operation detection marker 305. At this time, when comparing the latest captured image data and the captured image data captured immediately before, since the change of the pixel values between the captured image data items becomes small in a case where the user moves the hand slowly, there is a case where an accuracy for determining whether or the user's hand overlaps the operation detection marker 305 decreases. Therefore, the operation detection unit 272 may detect the operation by comparing the latest captured image data and the captured image data of several frames (for example, 5 frames) before.

Figure 10:
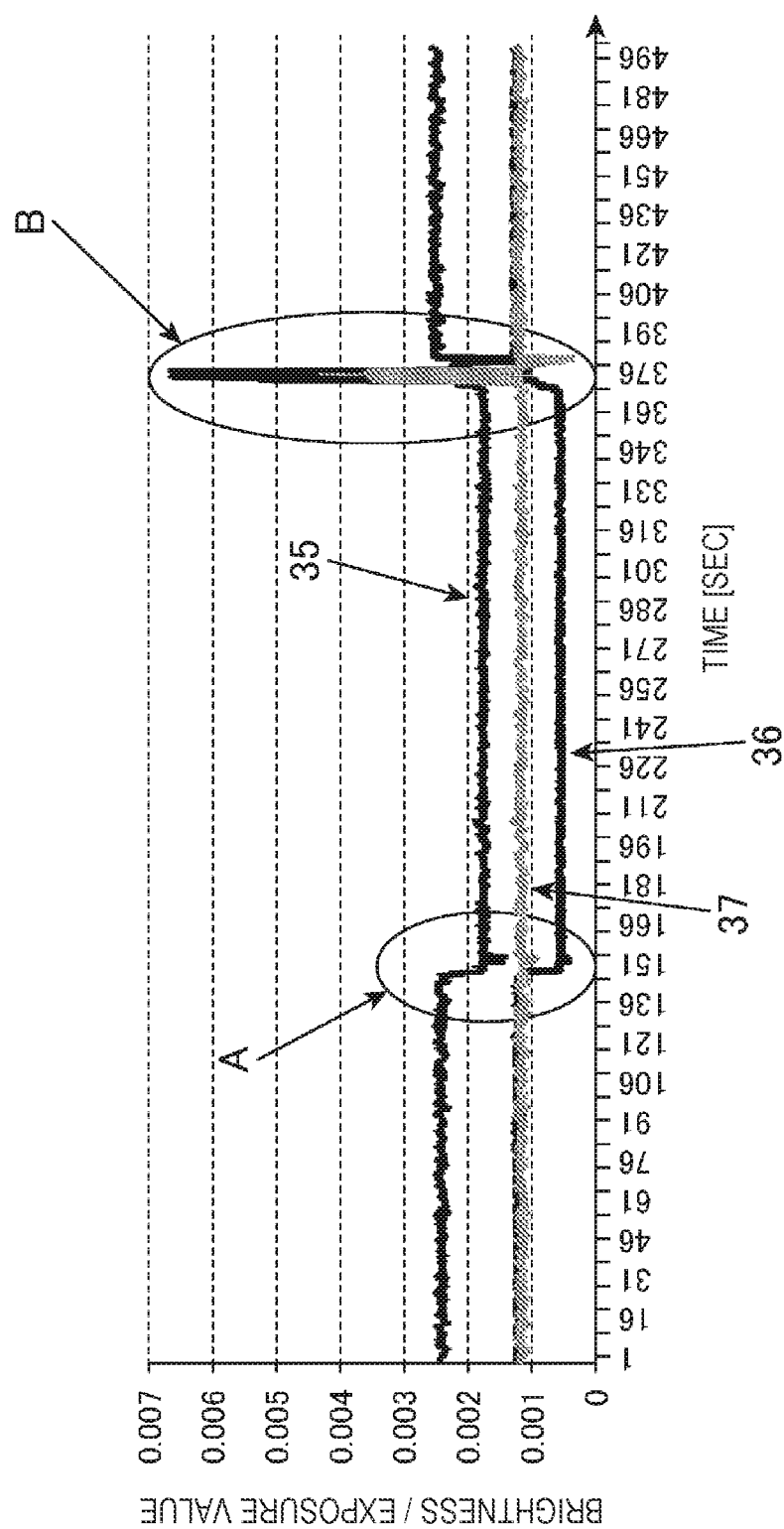
FIG. 10 is a graph illustrating a change of the brightness of the captured image data in a case where a room light is turned on and turned off.

FIG. 10 is a graph illustrating a change of the brightness of the captured image data in a case where a room light is turned on and turned off.

Curved lines 35 to 37 indicate a temporal change of a value obtained by dividing the brightness value by an exposure value illustrated in FIG. 10. Specifically, the curved line 35 indicates a change of a value obtained by dividing the brightness value of the pixel having the highest brightness among the pixel values of the pixels in the extraction area by the exposure value indicating the exposure brightness of the imaging element included in the imaging unit 240. The exposure value is a value indicating an exposure, that is, a numerical value indicating an exposed light amount projected on the imaging element, and is determined by an aperture value (F value) of a lens included in the imaging unit 240 and a shutter speed. The brightness value of the pixel having the highest brightness is assumed to be expressed as a brightness value$_{max}$, and a value obtained by dividing the brightness value$_{max}$ of the pixel having the highest brightness by the exposure value is assumed to be expressed as brightness value$_{max}$/exposure value.

In addition, the curved line 36 indicates a change of a value obtained by dividing the brightness value of the pixel at the black portion in the vicinity of the operation detection marker 305 by the exposure value. The brightness value of the pixel at the black portion is expressed as brightness value$_{min}$ and the value obtained by dividing the brightness value$_{min}$ of the pixel at the black portion by the exposure value is expressed as brightness value$_{min}$/exposure value.

In addition, the curved line 37 illustrated in FIG. indicates a difference between the (brightness value$_{max}$/exposure value) and the (brightness value$_{min}$/exposure value).

In addition, in a range "A" illustrated in FIG. 10, the change of the value obtained by dividing the brightness value by the exposure value in a case where a room light in the room where the projector 200 is installed is turned off is indicated. In addition, in a range "B" illustrated in FIG. 10, the change of the value obtained by dividing the brightness value by the exposure value in a case where the room light is turned on is indicated.

As is apparent by referring FIG. 10, in a case where the room light is turned on or off, the changes of values indicated by the curved line 35 and the curved line 36 are large. However, the values in the curved line 37 indicating the difference between the (brightness value$_{max}$/exposure value) and the (brightness value$_{min}$/exposure value) does not show a large change after the exposure on the imaging element is adjusted. Therefore, by using the value of (brightness value$_{max}$/exposure value)–(brightness value$_{min}$/exposure value) as a value for determining whether or not the operation on the operation detection marker 305 is performed, it is possible to reduce the influence of the ambient light due to turning on and off of the room light.

In addition, the values indicated by the curved line 35 and the curved line 36 changes largely in a case where the room light is turned on or off. Therefore, by comparing the (brightness value$_{max}$/exposure value) or the (brightness value$_{min}$/exposure value) with the threshold value set in advance, it is possible to determine whether or not the ambient light such as the room light is changed or not.

Therefore, the display control unit 271 may determine whether or not to perform the exposure control based on the value of the (brightness value$_{max}$/exposure value) or the (brightness value$_{min}$/exposure value). In a case where it is determined that the exposure control on the imaging unit 240 has to be performed, the display control unit 271 performs the exposure control and changes the display of the icon 307 to a display indicating a state in which the operation cannot be received. The display control unit 271 notifies of the fact that the operation on the operation detection marker 305 cannot be performed by, for example, blinking the display of the icon 307, by displaying the icon 307 in a color different from that of the initial state and that at the time of detecting the operation, or by changing the pattern of the icon 307.

In addition, the method for determining whether or not exposure control on the imaging unit 240 has to be performed may be method described below. That is, in a case where it is determined that a plurality of operation detection markers 305 continue to change for a predetermined time based on the captured image data updated by the imaging unit 240 at a certain time interval, in a case where it is determined that the brightness values of the pixels of at least one or more operation detection markers 305 continue to be saturated for a predetermined time, or in a case where it is determined that the maximum brightness value of the pixels in a predetermined range of the plurality of operation detection markers 305 is separated from the predetermined brightness range, the display control unit 271 determines that the exposure control on the imaging unit 240 has to be performed, and then, performs the exposure control.

In a case where the operation on the operation detection marker 305 is not detected (NO in STEP S14), the operation detection unit 272 continues to detect the operation on the operation detection marker 305 using the captured image data sequentially updated by the imaging unit 240.

In addition, in a case where it is determined that the operation on the operation detection marker 305 is detected (YES in STEP S14), the operation detection unit 272 determines whether or not the operation on a plurality of operation detection markers 305 is detected (STEP S15). In a case where the operation on a plurality of operation detection markers 305 is detected (YES in STEP S15), the operation detection unit 272 determines that the detected operation is invalid, and causes the processing performance control unit 273 not to perform the control of performing the processing corresponding to the plurality of operation detection markers 305. In this way, it is possible to avoid an erroneous processing performed due to the detection of an erroneous operation. In order to surely avoid the performance of the erroneous processing, it is preferable to continue to invalidate the operation from the detection of the operation on the plurality of operation detection markers 305 to a time when all the operations on the plurality of operation detection markers 305 return to a normal state (no detection).

In addition, in a case where the operation on a plurality of operation detection markers 305 is detected (YES in STEP S15), the operation detection unit 272 may restrict the performance of some of the processing items. For example, in a case where the operation on a plurality of operation detection markers 305 is detected, information on the processing items to be allowed to be performed is stored in the storage unit 260 in advance. In a case where the plurality of operation detection markers 305 from which the operation is detected is associated with the processing items which is allowed to be performed and stored in the storage unit 260, the operation detection unit 272 causes the processing performance control unit 273 to perform the control of performing the processing.

In addition, in a case where it is determined that the operation detection unit 272 does not detect the operation on a plurality of operation detection markers 305 (NO in STEP S15), the display control unit 271 changes the display mode of the icon 307 corresponding to the operation detection marker 305 from which the operation is detected during a predetermined period (for example, a period from a time after 0.3 second to a time after 1.5 second) (STEP S16). Hereinafter, the icon 307 corresponding to the operation detection marker 305 from which the operation is detected is expressed as a corresponding icon 307.

For example, the display control unit 271 blinks the corresponding icon 307 during a predetermined period, changes the color of the corresponding icon 307 to a color different from the color of the icon 307 other than the corresponding icon 307, or changes the pattern or the like of the corresponding icon 307.

Next, the operation detection unit 272 determines whether or not the user's hand or the finger overlaps the operation detection marker 305 from which the operation is detected is moved from the operation detection marker 305 (separated) during the predetermined period in which the display mode of the corresponding icon 307 is changed. The operation detection unit 272 determines whether or not the operation detection marker 305 from which the operation is detected is selected according to the above-described determination (STEP S17). Similarly to the case where it is determined whether or not the user's hand overlaps on the operation detection marker 305, the operation detection unit 272 determines whether or not the user's hand or the finger is moved from the operation detection marker 305 according to the captured image data from the imaging unit 240. When it is determined that the user's hand or the finger is moved from the operation detection marker 305, the operation detection unit 272 determines that the operation detection marker 305 from which the operation is detected is selected (YES in STEP S17). In addition, in a case where the user's hand or the finger is not moved from the operation detection marker 305 during the predetermined period, the operation detection unit 272 determines that the operation detection marker 305 from which the operation is detected is not selected (NO in STEP S17). In a case where the operation detection marker 305 from which the operation is detected is not selected, the operation detection unit 272 returns the display state of the corresponding icon to the initial state by the display control unit 271 and returns to STEP S14, and then, continues to detect the operation on the operation detection marker 305 using the captured image data sequentially updated by the imaging unit 240.

In a case where it is determined that the operation detection marker 305 is selected (YES in STEP S17), the operation detection unit 272 acquires the processing information associated with the selected operation detection marker 305 referring to the processing registration table 262 stored in the storage unit 260. The operation detection unit 272 outputs the acquired processing information to the processing performance control unit 273.

When the processing information is input from the operation detection unit 272, the processing performance control unit 273 controls each unit of the projector 200 and performs the processing associated with the selected operation detection marker 305 (STEP S18).

When the processing performance control unit 273 performs the processing associated with the operation detection marker 305, the display control unit 271 determines whether or not the display of the display image 300 on the screen SC is finished (STEP S19). In a case of a negative determination (NO in STEP S19), the display control unit 271 returns the process to STEP S14, and the operation detection unit 272 detects again the operation on the operation detection marker 305. In addition, in a case of a positive determination (YES in STEP S19), the display control unit 271 ends the processing flow.

In the flowchart described above, one processing is associated with one operation detection marker 305. However, a plurality of processing items may be associated with one operation detection marker 305. For example, the operation detection unit 272 switches the processing performed when the operation detection marker 305 is selected in a case where the condition set in advance is established and in a case where the condition is not established.

In the processing registration table 262, for example, both the processing information indicating the processing performed in a case where a control device (the image supply device 100) such as a PC is connected to the I/F unit 251 and the processing information indicating the processing performed in a case where the control device is not connected to the I/F unit 251 are registered in one marker identification information in association with each other. For example, processing performed by the projector 200 such as AV muting, freezing, and source switching are included in the example of the processing performed in a case where the control device is not connected to the I/F unit 251. In addition, processing performed by the control device such as page-up, page-down, full screen display, full screen non-display are included in the example of the processing performed in a case where the control device is connected to the I/F unit 251. In a case where the operation detection marker 305 corresponding to the processing performed by the control device is selected, the processing performance control unit 273 outputs the processing information indicating the processing to the control device and causes the control device to perform the processing.

While associating a part of a plurality of operation detection markers 305 with the processing performed by the projector 200 and associating other part of the operation detection markers 305 with the processing performed by the control device connected to the I/F unit 251, the display control unit 271 may display both the operation detection marker 305 associated with the processing by the projector 200 and the operation detection marker 305 associated with the processing by the control device in the state in which the control device is connected, and may display only the operation detection marker 305 associated with the processing by the projector 200 and not display the operation detection marker 305 associated with the processing by the control device in the state in which the control device is not connected. In this case, since only the valid operation detection marker 305 is displayed, the convenience for the user is improved.

In addition, a discrimination unit that discriminates types of the control device and the image supply device 100 connected to the I/F unit 251 or the image I/F unit 253 may be provided in the control unit 270, and then, the display control unit 271 may change the displayed operation detection marker 305 based on the result of discrimination by the discrimination unit, and may select the processing suitable for the connected control device and the image supply device 100.

As described above, the exemplary embodiment to which the display device and the method of controlling the display device according to the invention are applied includes the display unit 210, the display control unit 271, the operation detection unit 272, the imaging unit 240, and the processing performance control unit 273.

The display unit 210 displays an image on the screen SC. The imaging unit 240 images a plurality of operation detection markers 305 displayed on the screen SC.

The display control unit 271 causes the display unit 210 to display the input image which is based on the input image signal and the plurality of operation detection markers 305 used for the operation detection on the screen SC.

The operation detection unit 272 detects the operations on each of the plurality of operation detection markers 305 based on the captured image by the imaging unit 240.

The processing performance control unit 273 performs the processing corresponding to the operation detection marker 305 from which the operation is detected by the operation detection unit 272.

In addition, the display control unit 271 displays plurality of operation detection markers 305 at the outside of the input image on the screen SC. Therefore, a part of the input image is not hidden by the operation detection marker 305 and at the time when the operation on the operation detection marker 305 is detected, it is possible to detect the operation with high accuracy without being influenced by the display state of the input image. For example, in a case where the operation detection marker 305 is arranged on the input image in a superimposed manner, when the exposure is adjusted in accordance with the operation detection marker 305, there is a problem in that the pixels of the input image are saturated and the detection of the operation on the operation detection marker 305 may be influenced. However, in the present exemplary embodiment, since the operation detection marker 305 is arranged at the outside of the input image, and thus, such a problem can be eliminated.

In addition, a plurality of icons 307 respectively corresponding to a plurality of operation detection markers 305 are displayed at the positions corresponding to the operation detection markers 305. Therefore, it is possible to display the processing items or the like relating to the operation detection markers 305 in an easily understandable manner.

In addition, the display control unit 271 causes the display unit 210 to display a plurality of operation detection markers 305 having the same appearances.

Therefore, since the images having the same appearances are displayed as the plurality of operation detection marker 305, the processing load can be reduced by making the conditions for detecting the operation common.

In addition, the display control unit 271 causes the display unit 210 to display the operation detection marker 305 so as to be superimposed on the background color set in advance.

Therefore, since the operation detection marker 305 is displayed so as to be superimposed on the background color set in advance, it is possible to improve a visibility of the operation detection marker 305, and the display of the input image and the display of the operation detection marker 305 can be clearly distinguished.

In addition, in a case where a plural number of operation detection markers 305 are detected by the operation detection unit 272, at least a part of the processing items which are made to be performed by the processing performance control unit 273 corresponding to the operation detection marker 305 from which the operation is detected, are not performed.

Therefore, in a case where a plural number of operation detection markers 305 are detected, since at least apart of the processing items are not performed, it is possible to avoid an erroneous processing performed due to the detection of an erroneous operation.

In addition, the display control unit 271 detects a size of the projection area 10 on which the images are displayed on the screen SC by the display unit 210.

The display control unit 271 changes at least any of the display position of the operation detection marker 305 on the projection area 10, the display size of the operation detection marker 305, and the display interval of the plurality of operation detection markers 305 based on the detected size of the projection area 10.

Therefore, it is possible to display the operation detection markers 305 on the suitable display position, at the suitable display size, and at the suitable display interval on the projection area 10.

In addition, the display control unit 271 causes the display mode of the icon 307 corresponding to the operation detection marker 305 from which the operation is detected by the operation detection unit 272, to be changed. Therefore, the operation detection marker 305 from which the operation is detected and the other operation detection markers 305 can be distinguishably displayed.

In addition, the processing performance control unit 273 performs the processing for changing the relative display position of the plurality of operation detection markers 305 with respect to the input image on the screen SC according to the operation on any of the operation detection markers 305 displayed by the display unit 210.

Therefore, by the operation on the operation detection marker 305, it is possible to change the relative di splay position of the plurality of operation detection marker 305 with respect to the input image.

In addition, the projector 200 includes the I/F unit 251 connected to the external devices.

In a case where an external device is connected to the I/F unit 251, the display control unit 271 displays the operation detection marker 305 corresponding to the processing performed by the external device. In addition, in a case where an external device is not connected to the I/F unit 251, the display control unit 271 does not display the operation detection marker 305 corresponding to the processing performed by the external device.

Therefore, since the invalid operation detection marker 305 is not displayed in the operation detection area 302, the user's convenience is improved.

In the projector 200, the processing items performed by the processing performance control unit 273 according to the operation on any of the operation detection markers 305 displayed by the display unit 210 are different from each other in a case where the external device is connected to the I/F unit 251 and in a case where the external device is not connected to the I/F unit 251.

Therefore, in a case where the external device is connected to the I/F unit 251, for example, it is possible to cause the projector 200 to perform the processing corresponding to the processing performed by the external device. In addition, in a case where the external device is not connected to the I/F unit 251, it is possible to cause the projector 200 to perform the processing which is independently performed by the projector 200.

In addition, the display control unit 271 causes the icon 307 to be displayed inside (input image side) of the operation detection marker 305.

Therefore, when the user located at the outside of the projection area 10 operates the operation detection marker 305, the user's hand does not overlap the icon 307, and thus, the visibility of the icon 307 is not decreased.

The exemplary embodiment described above is an embodiment preferable to the invention. However, the invention is not limited thereto, and various modifications can be made without departing from the gist of the invention.

In the exemplary embodiment described above, in a case where it is determined that the operation is not the operation on a plurality of operation detection markers 305 in STEP S15, the display mode of the icon 307 is changed in STEP S16. However, the display mode of the icon 307 may be changed at a time point when the operation on any one of the operation detection markers 305 is detected, and thereafter, in a case where the operation on the plurality of operation detection markers 305 is detected, the changed display mode of the icon 307 may be returned to the original one.

In addition, in the exemplary embodiment described above, as the light modulator 212 that modulates the light emitted from the light source, the configuration using three transmission type liquid crystal panels corresponding to each color of RGB is described as an example. However, the invention is not limited thereto. For example, three reflection type liquid crystal panels may be used in the configuration, or a method using a combination of one liquid crystal panel and a color wheel may be used in the configuration. Alternatively, a DMD method using three digital mirror devices (DMD), or using a combination of one digital mirror device and one color wheel may be used in the configuration. In a case of using only one liquid crystal panel or the DMD as the light modulator, a member corresponding to a composition optical system such as a cross dichroic prism is not necessary. In addition, besides the liquid crystal panel and the DMD, any light modulator 212 can be adopted without any problem as long as the light emitted from the light source can be modulated.

Each functional unit of the projector 200 illustrated in FIG. 1 illustrates a function configuration, and a specific implementation form is not particularly limited. That is, it is not necessary to implement the hardware that corresponds to each functional unit, and of course, the functions of a plurality of functional units can be realized by one processor executing programs. In addition, in the exemplary embodiment described above, a part of the functions realized by software may be realized by hardware, or a part of the functions realized by hardware may be realized by software. In addition, the specific detail configuration of other parts of the projector 200 may be arbitrarily changed without departing from the spirit of the invention.

In addition, the unit of processing items in the flowchart illustrated in FIG. 4 is divided according to the main content of the processing in order to make it easy to understand the processing by the control unit 270 of the projector 200, and the invention is not limited by the method of dividing the unit or the name of the processing. In addition, the processing by the control unit 270 can be divided into more units of processing items depending on the content of the processing, or can be divided such that one unit of processing includes more processing items. In addition, an order of the processing items in the flowchart is not limited to the illustrated example.

The entire disclosure of Japanese Patent Application No. 2016-177223, filed Sep. 12, 2016 is expressly incorporated by reference herein.

What is claimed is:

1. A display device comprising:
    a projector that displays an image on a display surface; and
    a processor or circuit programmed to:
        cause the projector to display on the display surface: (i) an input image which is based on an input image signal, (ii) a plurality of detection images used for operation detection, and (iii) a plurality of identification images that are each displayed adjacent to a position corresponding to a respective detection image of the plurality of detection images, wherein the plurality of detection images and the plurality of identification images are displayed outside of the input image on the display surface;
        cause an imaging element to capture the plurality of detection images displayed on the display surface;
        detect whether an operation is performed on each of the plurality of detection images based on the captured image; and
        perform processing corresponding to the detection image upon which the operation is detected.

2. The display device according to claim 1, wherein the processor or circuit causes the projector to display the plurality of detection images having the same appearances.

3. The display device according to claim 1, wherein the processor or circuit causes the projector to display the detection image on a background color set in advance in a superimposed manner.

4. The display device according to claim 1, wherein, in a case where a plural number of detection images are detected, the processor or circuit does not perform all of the processing corresponding to all of the detected plural number of detection images.

5. The display device according to claim 1, wherein the processor or circuit is further programmed to:
    measure a size of a display area on the display surface on which the projector displays an image, and
    change any one of a display position of the detection image on the display area, a display size of the detection image, and a display interval of the plurality of detection images based on the measured size of the display area.

6. The display device according to claim 1, wherein the processor or circuit causes a display mode of an identification image corresponding to the detection image from which the operation is detected, to be changed.

7. The display device according to claim 1, wherein the identification image is displayed on an input image side of the detection image.

8. The display device according to claim 1, wherein the processor or circuit performs processing for changing a relative display position of the plurality of detection images with respect to the input image on the display surface according to the operation on any one of the detection images displayed by the projector.

9. The display device according to claim 1, further comprising:
    an interface that is connected to an external device, wherein
    the processor or circuit displays the detection image corresponding to the processing performed by the external device in a case where the external device is connected to the interface, and does not display the detection image corresponding to the processing performed by the external device in a case where the external device is not connected to the interface.

10. The display device according to claim 1, further comprising:
an interface connected to an external device, wherein
the processing performed by the processor or circuit according to the operation on any of the detection images displayed by the projector are different from each other in a case where the external device is connected to the interface and in a case where the external device is not connected to the interface.

11. A method of controlling a display device that displays an image on a display surface, the method comprising:
displaying on the display surface: (i) an input image which is based on an input image signal, (ii) a plurality of detection images used for operation detection, and (iii) a plurality of identification images that are each displayed adjacent to a position corresponding to a respective detection image of the plurality of detection images, wherein the plurality of detection images and the plurality of identification images are displayed outside of the input image on the display surface;
capturing the plurality of detection images displayed on the display surface;
detecting whether an operation is performed on each of the plurality of detection images based on the captured image; and
performing processing corresponding to the detection image upon which the operation is detected.

* * * * *